United States Patent [19]
Colletti

[11] Patent Number: 6,019,697
[45] Date of Patent: Feb. 1, 2000

[54] HYBRID TRANSMISSION

[76] Inventor: Gregory J. Colletti, 468 Buckhorn Dr., Belvidere, N.J. 07823

[21] Appl. No.: 08/946,565

[22] Filed: Oct. 7, 1997

Related U.S. Application Data

[60] Provisional application No. 60/029,533, Nov. 1, 1996.

[51] Int. Cl.[7] .................................................. F16H 3/44
[52] U.S. Cl. .............................................. 475/303; 475/285
[58] Field of Search .................................... 475/285, 303, 475/317, 320, 321

[56] References Cited

U.S. PATENT DOCUMENTS

| | | |
|---|---|---|
| 1,983,834 | 12/1934 | Barnes . |
| 2,582,487 | 1/1952 | Kelbel . |
| 2,599,559 | 6/1952 | Kelbel . |
| 2,658,413 | 11/1953 | Orr et al. ............................. 475/303 X |
| 2,910,893 | 11/1959 | Peras . |
| 3,077,794 | 2/1963 | Candellero .............................. 475/285 |
| 3,230,796 | 1/1966 | Thomson ................................. 475/303 |
| 3,478,622 | 11/1969 | Reid . |
| 3,529,494 | 9/1970 | Matte . |
| 4,274,304 | 6/1981 | Curtiss . |
| 4,489,626 | 12/1984 | Lemon .................................... 475/159 |
| 4,569,252 | 2/1986 | Harper . |
| 5,390,347 | 2/1995 | Buri et al. ............................... 475/303 |

FOREIGN PATENT DOCUMENTS

| | | |
|---|---|---|
| 2339253 | 2/1974 | Germany . |
| 6-323378 | 11/1994 | Japan . |
| WO 86/07423 | 12/1986 | WIPO . |

*Primary Examiner*—Khoi Q. Ta
*Attorney, Agent, or Firm*—Richard C. Litman

[57] ABSTRACT

A forward/reverse clutchless transmission with a 1 to 1 forward drive ratio. The invention is a transmission having a housing with two support bearings supporting axially aligned input and output shafts. In a first embodiment, the input shaft is supporting a planetary carrier, a sun gear, a plurality of planetary gears, a clutching hub, a mechanical engagement ring, and a synchronizing ring. The output shaft is supporting a ring gear. In forward mode the mechanical engagement ring slides to engage the planetary carrier forming a solid mechanical coupling with the output shaft. During reverse operation the mechanical engagement ring is in a neutral position and an brake band is actuated thereby stopping the planetary carrier rotation and making the output shaft rotate in the reverse direction. The second embodiment works in the same manner but the input shaft is supporting a planetary carrier, a sun gear, and a plurality of planetary gears, while the output shaft is supporting a ring gear, a clutching hub, a mechanical engagement ring, and a baulk or synchronizing ring. The third embodiment is a combination of the first and the second embodiments. The various embodiments give the present invention versatility and increase the number of applications for which it may be used.

19 Claims, 9 Drawing Sheets

HYBRID TRANSMISSION

CROSS-REFERENCE TO RELATED APPLICATION

This application claims the benefit of U.S. Provisional Patent Application Serial No. 60/029,533, filed Nov. 1, 1996.

BACKGROUND OF THE INVENTION

1. Field of the Invention

The present invention relates generally to a forward/reverse clutchless transmission with a 1 to 1 forward drive ratio. More specifically, the invention relates to a planetary gear transmission with a synchro-meshing system which allows operation at moderate input shaft R.P.M. without the aid of a clutch.

2. Description of Related Art

Typical manual transmission systems utilize a clutch mechanism between the power source and the input shaft which disengages the power to the input shaft to allow the transmission to change gears without grinding the gears. Clutch mechanisms are relatively complex and expensive pieces of machinery and tend to require frequent maintenance due to slippage wear caused by continuous loading and unloading. The expense of a clutch mechanism for use in transmissions made for simple forward and reverse output tends to be cost prohibitive. The direct engagement between the internal gears that would result if a clutch mechanism was not used would wear on the internal gears due to grinding during engagement on the gears and therefore the gears would need to be stronger and larger to prevent their failure due to the wear. There is a need for a transmission which is simple in design and which combines the benefits of a planetary gear system with a synchro-mesh system.

U.S. Pat. No. 1,983,834, issued on Dec. 11, 1934, to William B. Barnes describes a planetary gear overdrive transmission adapted for association with the main transmission of an automobile whereby a supplemental speed change may be obtained. The patent to Barnes fails to describe the benefits of the present invention.

U.S. Pat. No. 2,582,487, issued on Jan. 15, 1952, to Donald W. Kelbel describes a planetary gear transmission which provides a plurality of speed ratios between the driving and the driven shafts and uses two clutches. U.S. Pat. No. 2,599,559, issued on Jun. 10, 1952, to Donald W. Kelbel describes a planetary gear transmission which is provides three forward speeds and a reverse speed and which uses an overrunning clutch. The clutch mechanisms used in the Kelbel patents make the designs more complex and expensive to maintain.

U.S. Pat. No. 2,910,893, issued on Nov. 3, 1959, to Lucien Péras describes a reversing device that incorporates planetary gears, an engagement sleeve, and a friction clutch to provide smooth forward and reverse switching. The patent to Péras describes a permanently actuated friction clutch between the driving and the driven shafts which results in a continuous loss of energy and increases the need to replace worn parts.

U.S. Pat. No. 3,478,622, issued on Nov. 18, 1969, to Larry R. Reid describes a marine planetary gear transmission which provides a forward direct driving relation by caging the planetary gears, the input sun gear, and the output ring gear by moving the planetary gear system longitudinally on the input shaft and bringing a further ring gear that is common to the planetary gears into engagement with the sun gear. Reverse drive is obtained by braking the caging member associated with the planetary gears while the further ring gear is disconnected from the sun gear. U.S. Pat. No. 3,529,494, issued on Sep. 22, 1970, to Gaston Matte describes a reversing gear assembly which uses a planetary gear system, a sun gear and a ring gear. Both the patent to Reid and the patent to Matte require the planetary carrier to move longitudinally on the input shaft and fail to describe any mechanism to provide a smooth and efficient shifting from neutral to forward.

U.S. Pat. No. 4,274,304, issued on Jun. 23, 1981, to George R. Curtiss describes an in-line reversing mechanism comprised of a planetary gearing assembly and a braking assembly for reverse operation. The reversing mechanism requires the use of sawtooth-like teeth which only engage in one rotational direction and several sets of epicyclic gear trains in order to facilitate the reversing mechanism.

U.S. Pat. No. 4,569,252, issued on Feb. 11, 1986, to Joseph F. B. Harper describes a planetary gear transmission using a planetary gearing system comprising a sun gear meshingly engaged with multiple planetary gears carried by a planetary carrier which planetary gears are in turn meshed with a ring gear and which includes a clutching means. The patent to Harper is complex in design. The patent to Harper uses a clutching means to shift from a neutral position to a reverse position. The use of a clutching means to accomplish a reverse rotation of the output shaft is unnecessary and will increase the cost to manufacture and maintain the transmission.

German Patent Number 2,339,253, published on Feb. 14, 1974, and PCT International Publication Number WO 86/07423, published on Dec. 18, 1986, describe reversing gear assemblies which use a planetary gear system, a sun gear and a ring gear. Both patent fail to describe any mechanism to provide a smooth and efficient shifting from neutral to forward.

Japanese Patent Application Publication Number 06323378(A), published on Nov. 25, 1994, describes a reversing gear assembly which use a planetary gear system, a sun gear, a ring gear, and a clutch mechanism. The Japanese patent application describes a transmission which is complex in design and requires the use of a clutch mechanism.

None of the above inventions and patents, taken either singularly or in combination, is seen to describe the instant invention as claimed. Thus a hybrid transmission solving the aforementioned problems is desired.

SUMMARY OF THE INVENTION

The present invention relates generally to a forward/reverse clutchless transmission with a 1 to 1 forward drive ratio. More specifically, the invention is a transmission having a housing with two support bearings supporting axially aligned input and output shafts. In the first embodiment of the present invention the input shaft is supporting a planetary carrier, a sun gear, a plurality of planetary gears, a clutching hub, a mechanical engagement ring, and a synchronizing ring. The output shaft is supporting a ring gear. In forward mode the mechanical engagement ring slides to engage the planetary carrier forming a solid mechanical coupling with the output shaft. During reverse operation the mechanical engagement ring is in a neutral position and an brake band is actuated thereby stopping the planetary carrier rotation and making the output shaft rotate in the reverse direction.

The second embodiment of the present invention works in the same manner as the first embodiment, but the input shaft is supporting a planetary carrier, a sun gear, and a plurality of planetary gears, while the output shaft is supporting a ring gear, a clutching hub, a mechanical engagement ring, and a baulk or synchronizing ring. The third embodiment of the present invention is a combination of the first and the second embodiments. The various embodiments give the present invention versatility and increase the number of applications for which it may be used.

Accordingly, it is a principal object of the invention to provide a rotative power transmission system which combines the benefits of a planetary gear system with a synchromesh system and eliminates the need for a clutch mechanism.

It is another object of the invention to provide a power transmission system having a forward drive ratio of 1 to 1 and that is capable of shifting via a clutchless planetary gear system to reverse drive.

It is a further object of the invention to provide a power transmission system which is simple in design and relatively inexpensive to maintain.

Still another object of the invention is to provide a power transmission system which creates relatively low amounts of wear on the internal gears during engagement and therefore reduces their chances of failing due to wear.

It is an object of the invention to provide improved elements and arrangements thereof in a hybrid transmission for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
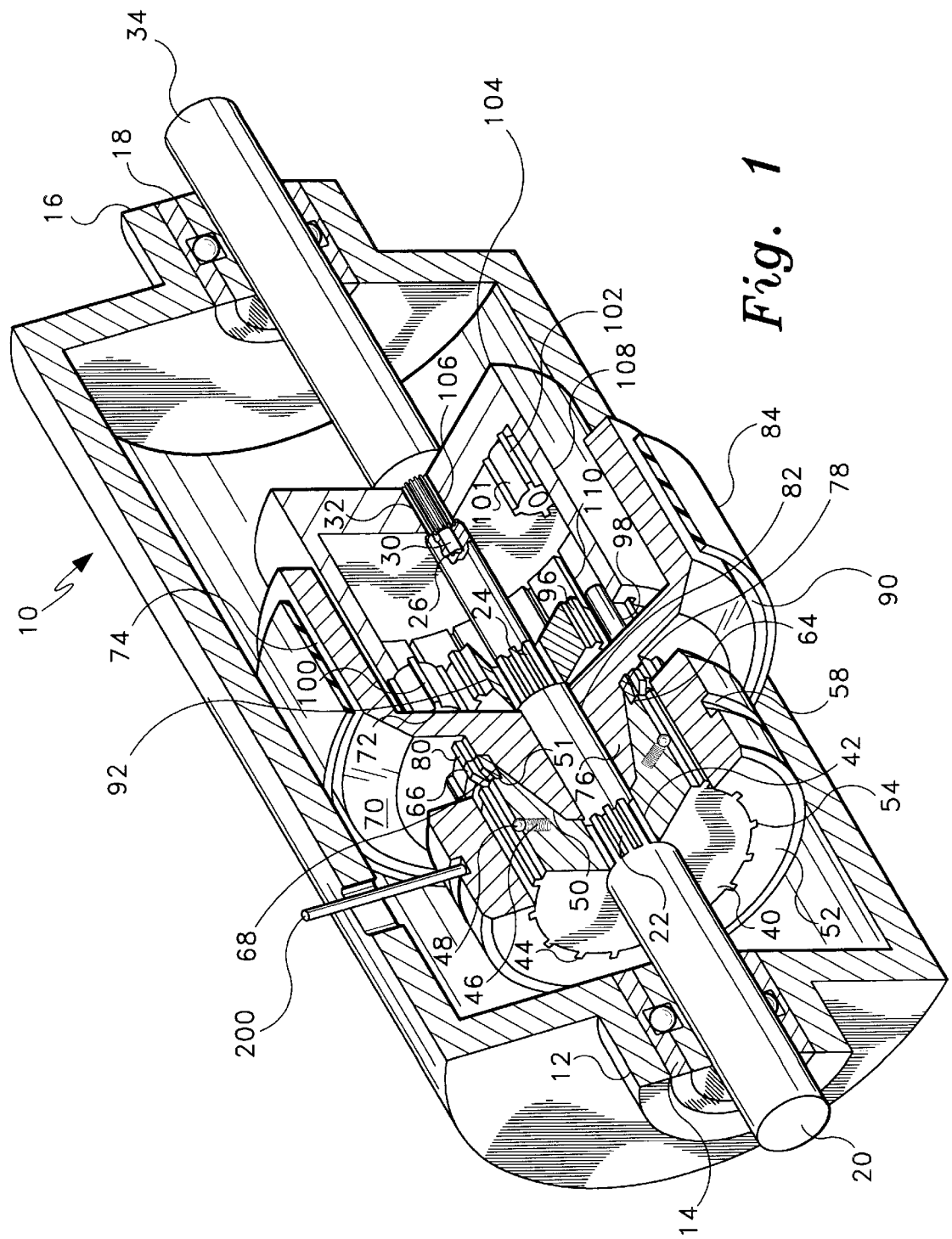
FIG. 1 is a partial cross-sectional perspective view of the first embodiment of the hybrid transmission of the present invention having a hub and an engagement ring mounted on the input shaft.
Figure 2:
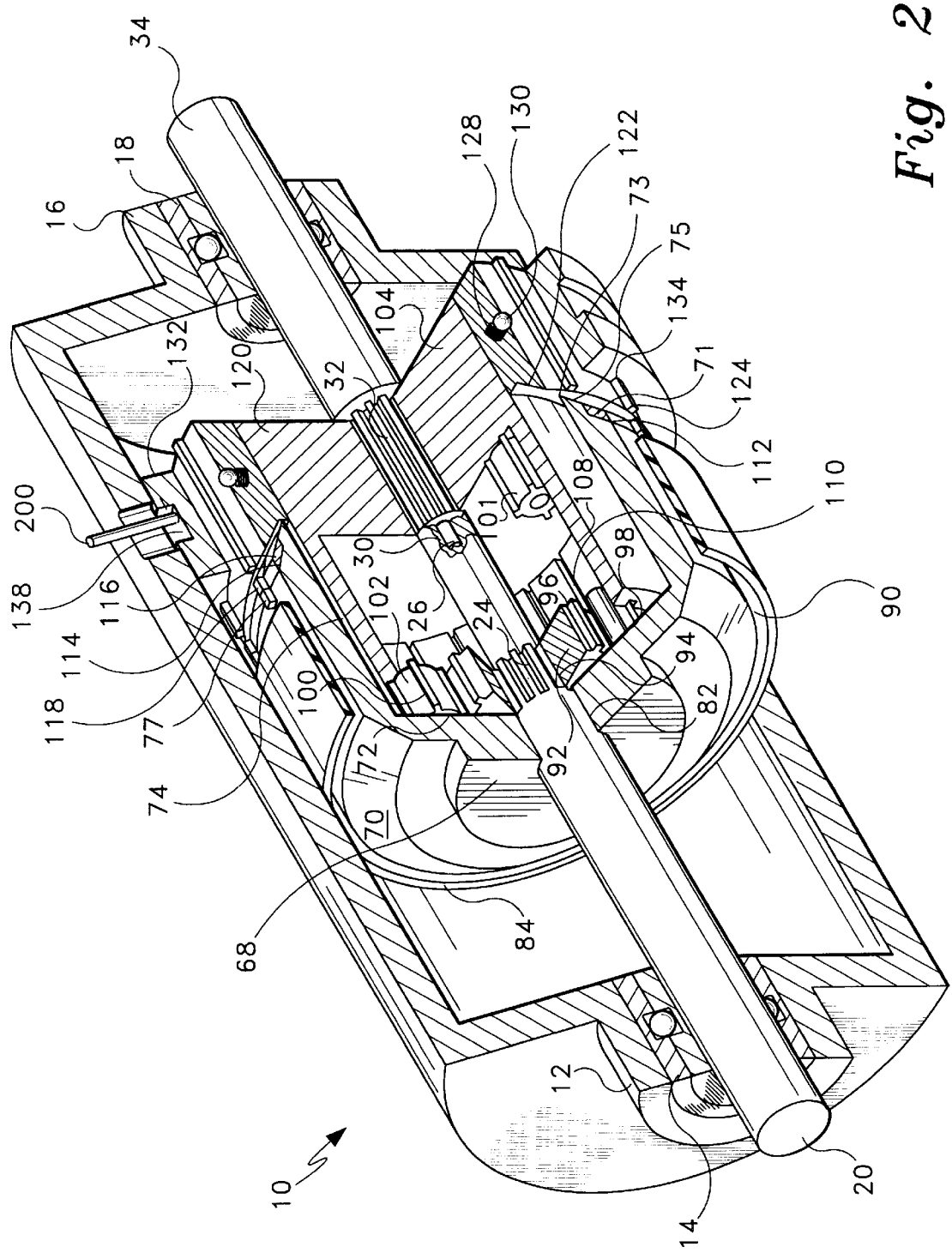
FIG. 2 is a partial cross-sectional perspective view of the second embodiment of the hybrid transmission of the present invention having a hub and an engagement ring mounted on the output shaft.
Figure 3:
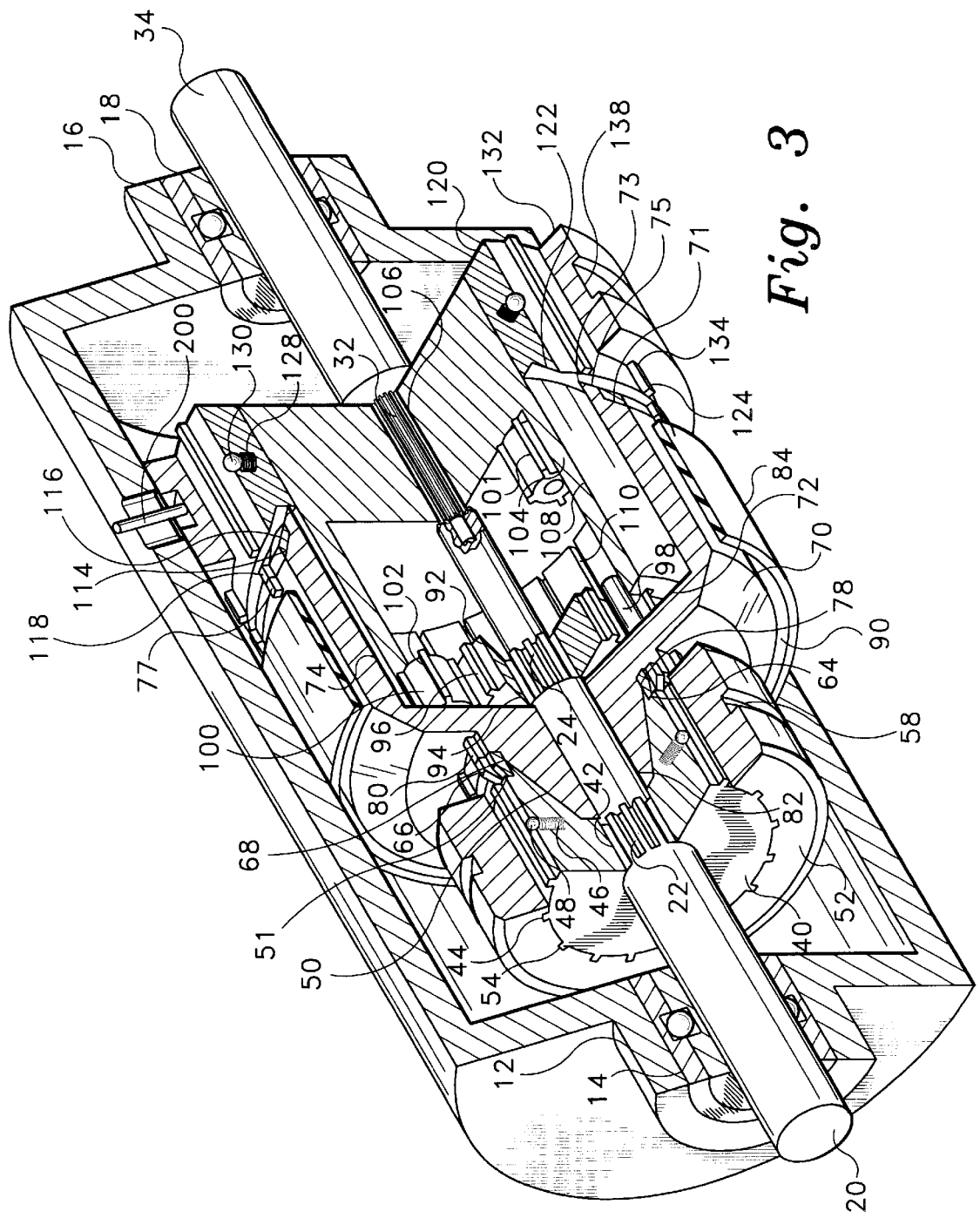
FIG. 3 is a partial cross-sectional perspective view of the third embodiment of the hybrid transmission of the present invention having a hub and an engagement ring mounted on both the input and the output shafts.
Figure 4:
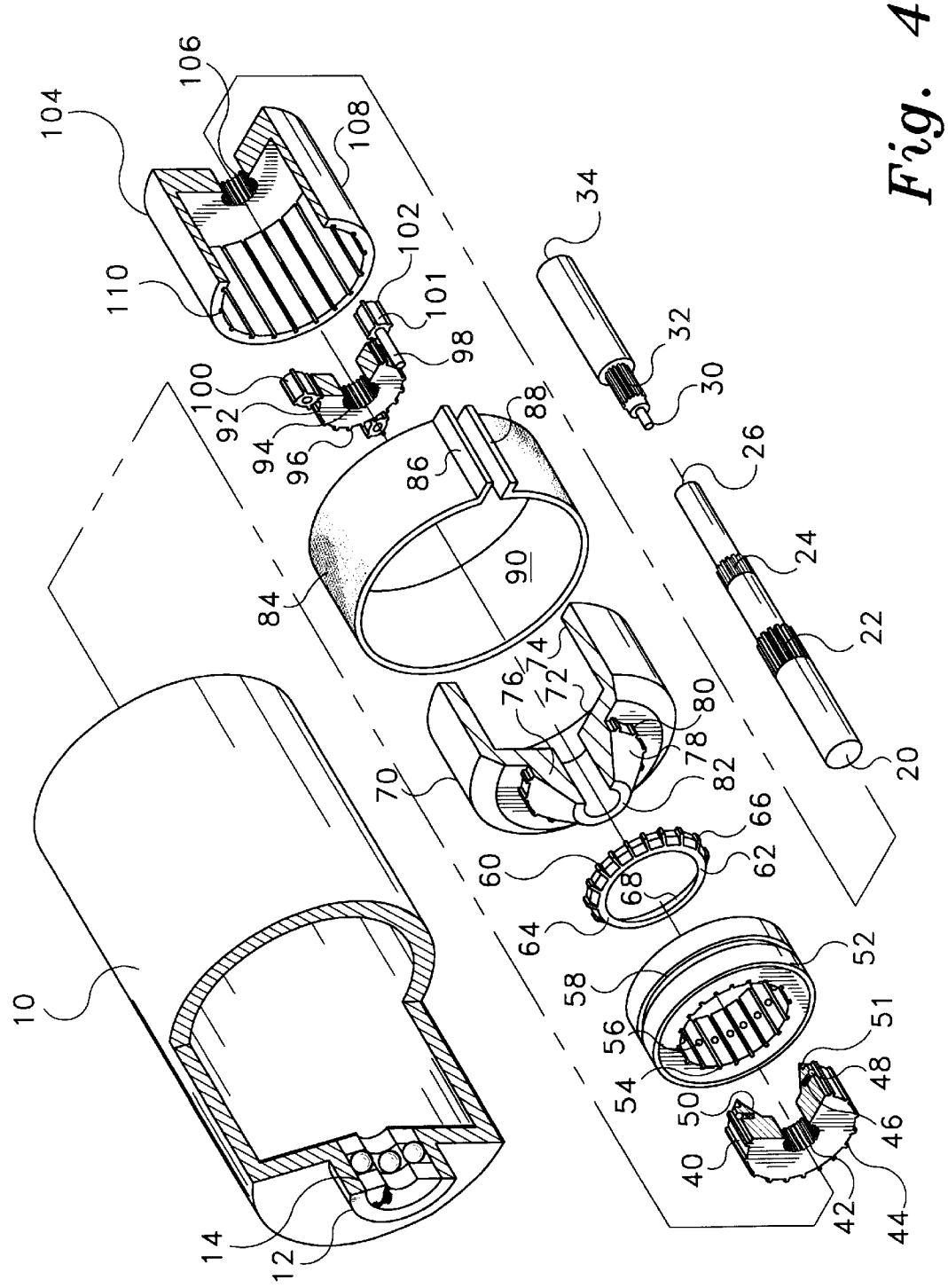
FIG. 4 is an exploded perspective view of the first embodiment of the hybrid transmission of the present invention.
Figure 5:
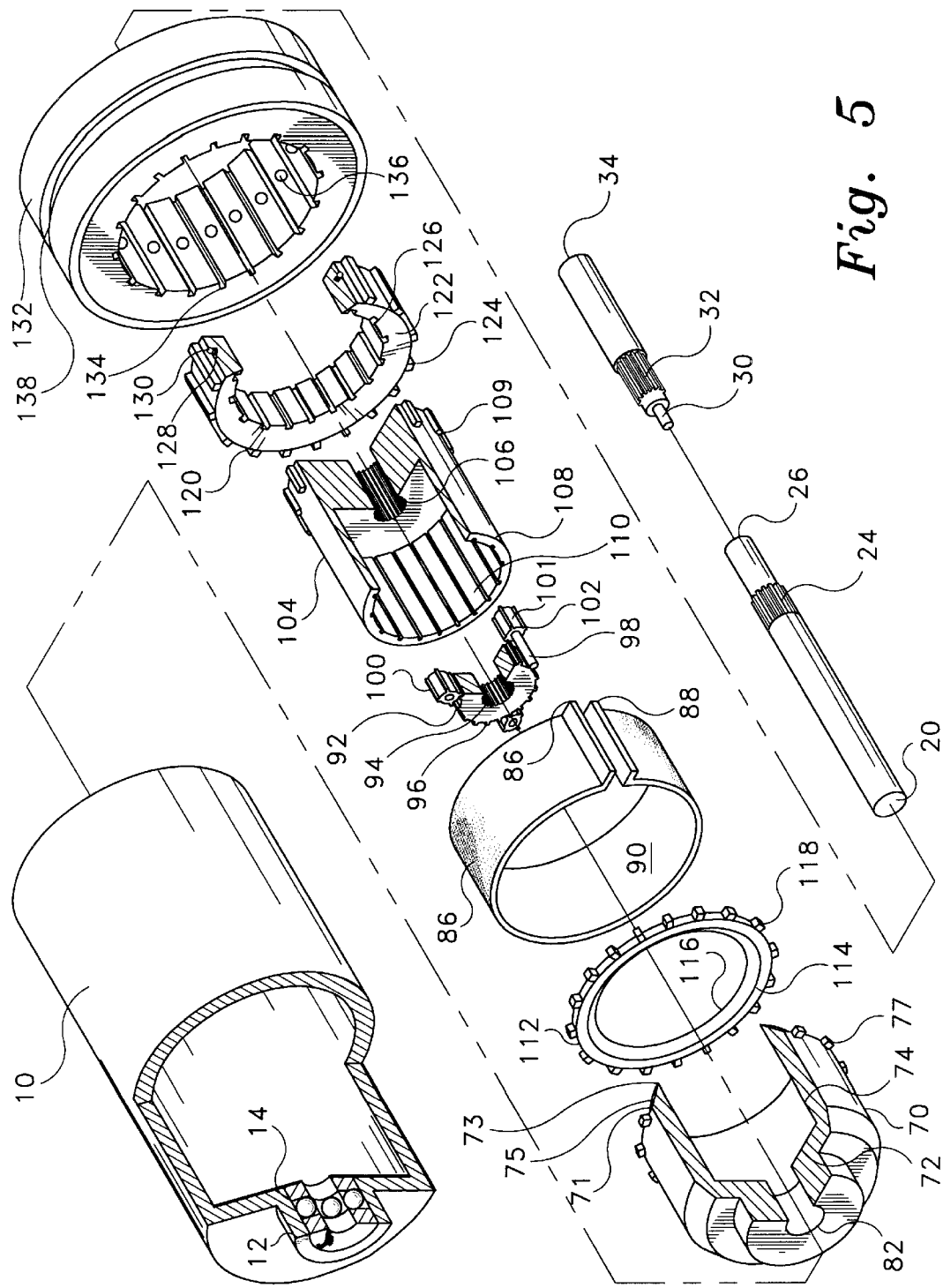
FIG. 5 is an exploded perspective view of the second embodiment of the hybrid transmission of the present invention.
Figure 6:
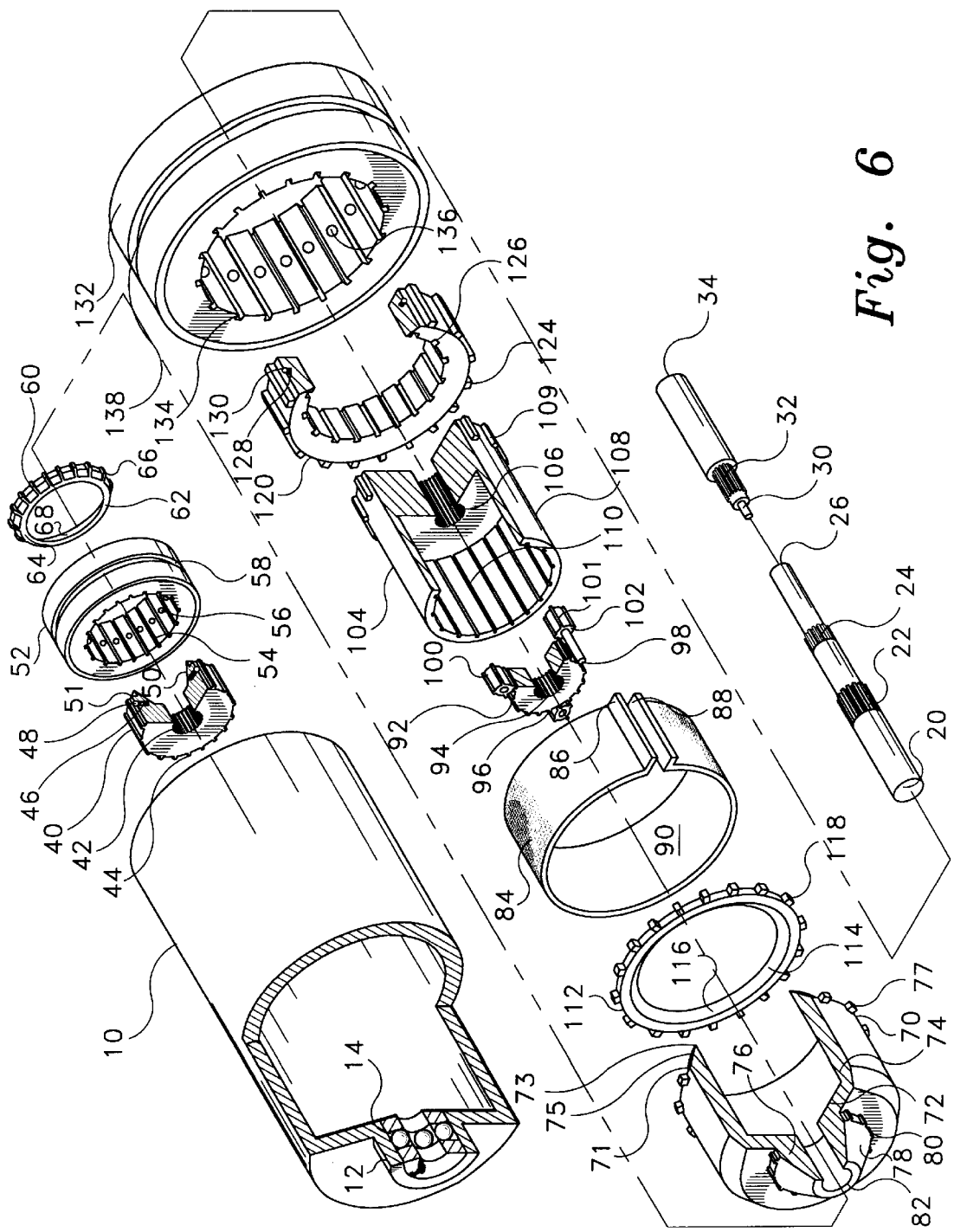
FIG. 6 is an exploded perspective view of the third embodiment of the hybrid transmission of the present invention.
Figure 8:
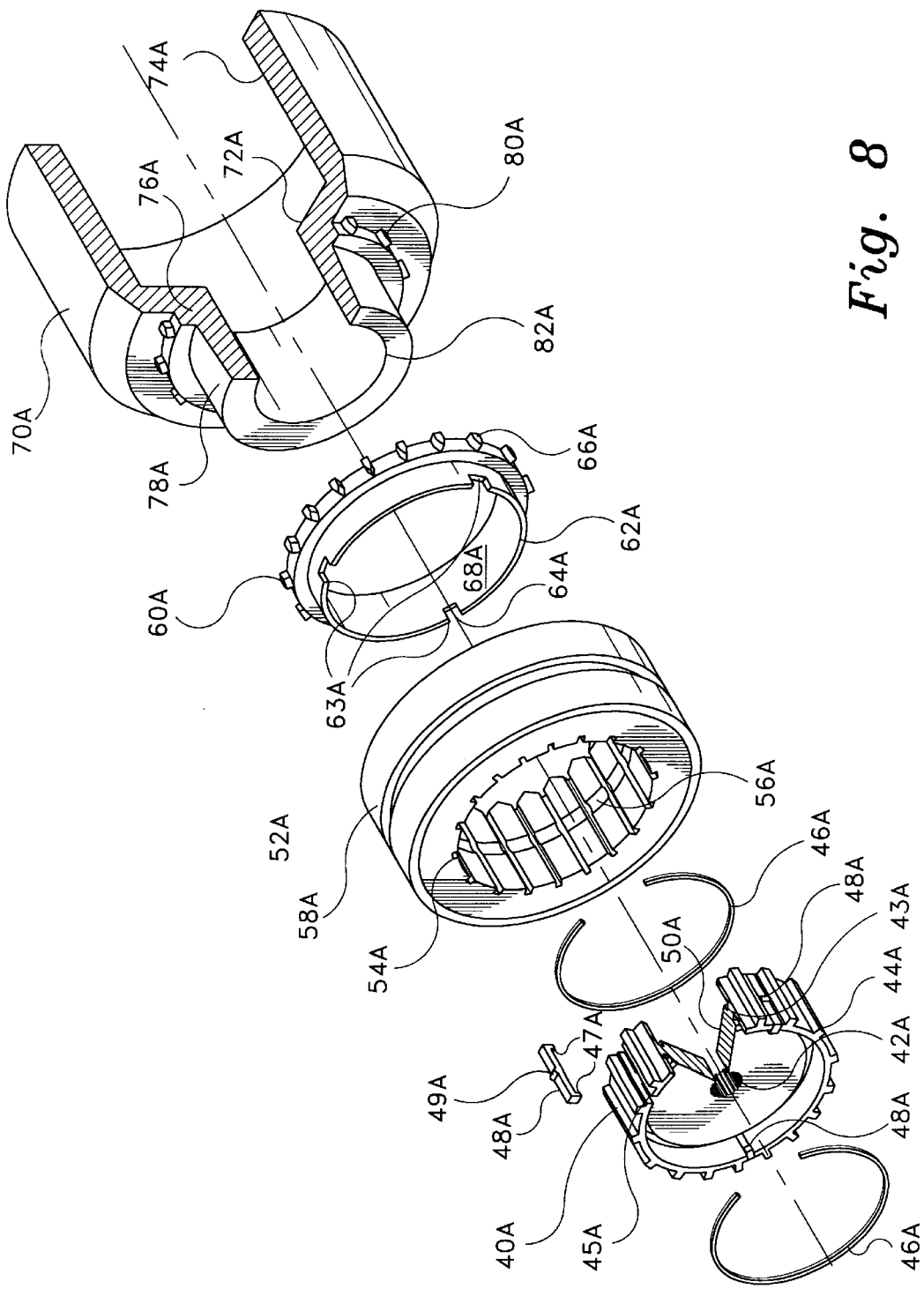
FIG. 8 is an exploded perspective view of the preferred clutching assembly for use in the first and the third embodiments of the present invention.
Figure 9:
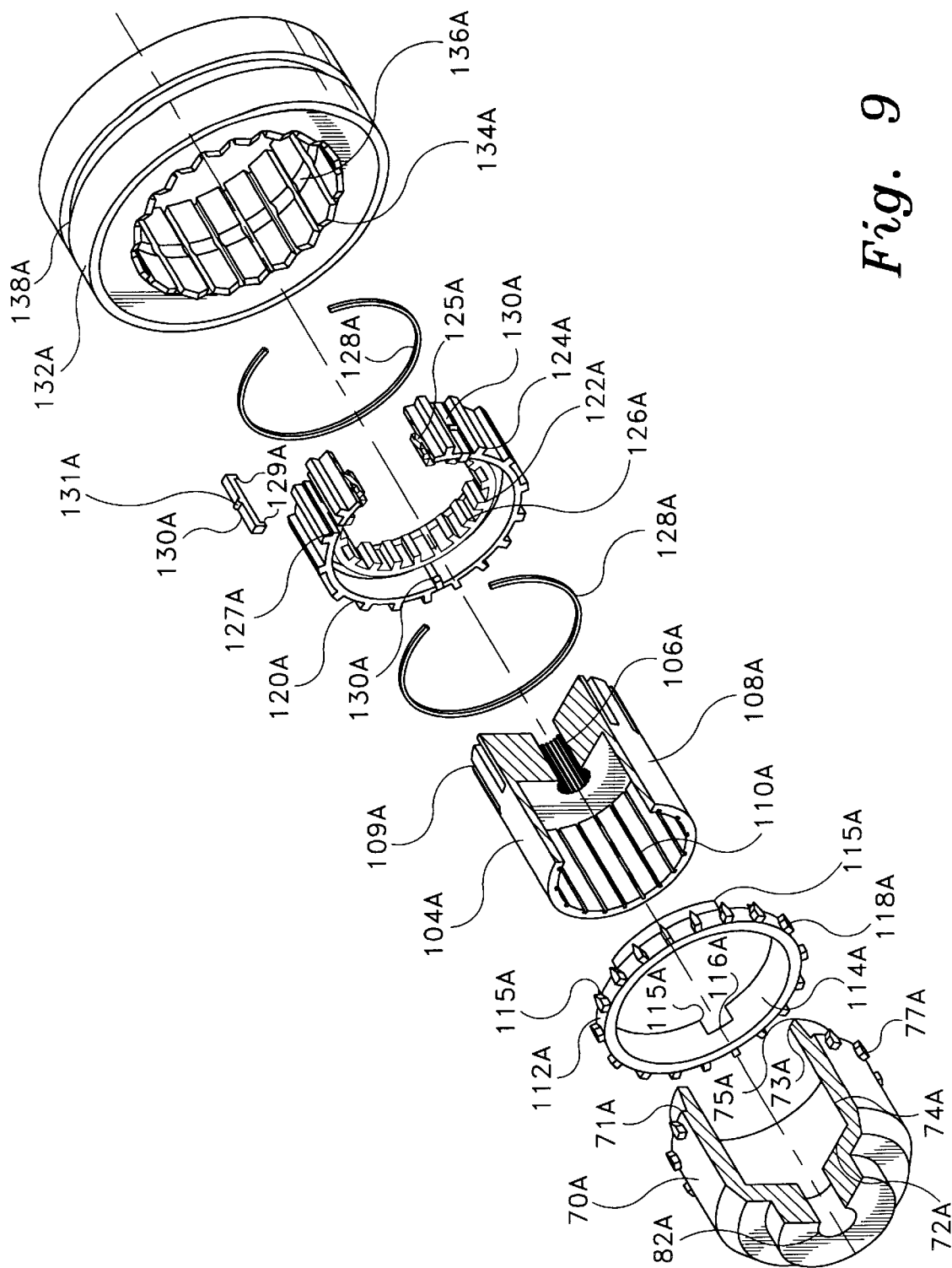
FIG. 9 is an exploded perspective view of the preferred clutching assembly for use in the second and third embodiments of the present invention.

The present invention has three main embodiments; FIGS. 1 and 4 show the first embodiment, FIGS. 2 and 5 show the second embodiment, and FIGS. 3 and 6 show the third embodiment. FIG. 8 shows the preferred clutching assembly which can be used in both the first and the third embodiment in place of the clutching assembly shown in FIGS. 1, 3, 4, and 6. FIG. 9 shows the preferred clutching assembly which can be used in both the second and the third embodiments in place of the clutching assembly shown in FIGS. 2, 3, 5, and 6.

Referring to FIGS. 1, 2 and 3, all three embodiments of the present invention include a stationary support housing 10, an input shaft 20 driven by a power source, an output shaft 34, a planetary carrier 70, a brake band 84, a sun gear 92, at least one planetary gear 100, and a ring gear 104.

The input 20 and output 34 shafts are axially aligned and rotatably mounted within the support housing 10. The support housing 10 has openings in its end walls, 12 and 16, to receive ball bearing assemblies, 14 and 18 respectively, for journalling the adjacent portions of the shafts. The input shaft 20 has a hole 26 on one end in which sits a pin section 30 on one end of output shaft 34. Hole 26 houses a bearing (not shown) which allows the input shaft 20 and the output shaft 34 to rotate independently of each another.

The hybrid transmission of the present invention includes a planetary carrier 70 having a bore 82 which is freely rotatable about the input shaft 20. Bore 82 contains a bearing (not shown) which allows the planetary carrier 70 to smoothly rotate about input shaft 20. The planetary carrier has a cylindrical portion 74 which is attached at one end to an annular section 72. The annular section 72 has a plurality of holes (not shown) which each have a planetary gear pinion 98 affixed therein. A plurality of planetary gears 100 are rotatably supported on the planetary gear pinions 98 which are fixedly supported by the planetary carrier 70. Three planetary gears 100 and three planetary gear pinions 98 are shown in the Figures. Planetary gear 101 is shown in FIGS. 1 through 6 in an exploded position in order to show planetary gear pinion 98.

The input shaft 20 of the hybrid transmission has a sun gear meshing section 24 having external splines which engage the inner surface 94 of the sun gear 92, thereby forcing the input shaft 20 and the sun gear 92 to rotate at the same speed. The outer surface of the sun gear 92 has grooves 96 which mesh with the teeth 102 on the outer surface of the planetary gears 100.

Output shaft 34 has a ring gear meshing section 32 having external splines which engage the inner surface 106 of the ring gear 104, thereby forcing the output shaft 34 and the ring gear 104 to rotate at the same speed. The ring gear 104 has a cylindrical section 108 that extends toward and encircles the sun gear 92. The inner surface of the cylindrical section 108 of the ring gear 104 has grooves 110 which mesh with the teeth 102 on the planetary gears 100.

All three embodiments of the present invention also include a brake band 84 which is coupled to the support housing 10. The brake band 84 is a C-shaped piece of flexible metal that substantially encircles the outer surface of the planetary carrier 70. The brake band 84 has a first end 86 and a second end 88. The present invention includes several different means of actuating the brake band 84 such that the inner surface 90 of the brake band 84 frictionally engages the planetary carrier 70 and thereby prevents its rotation.

Figure 7:
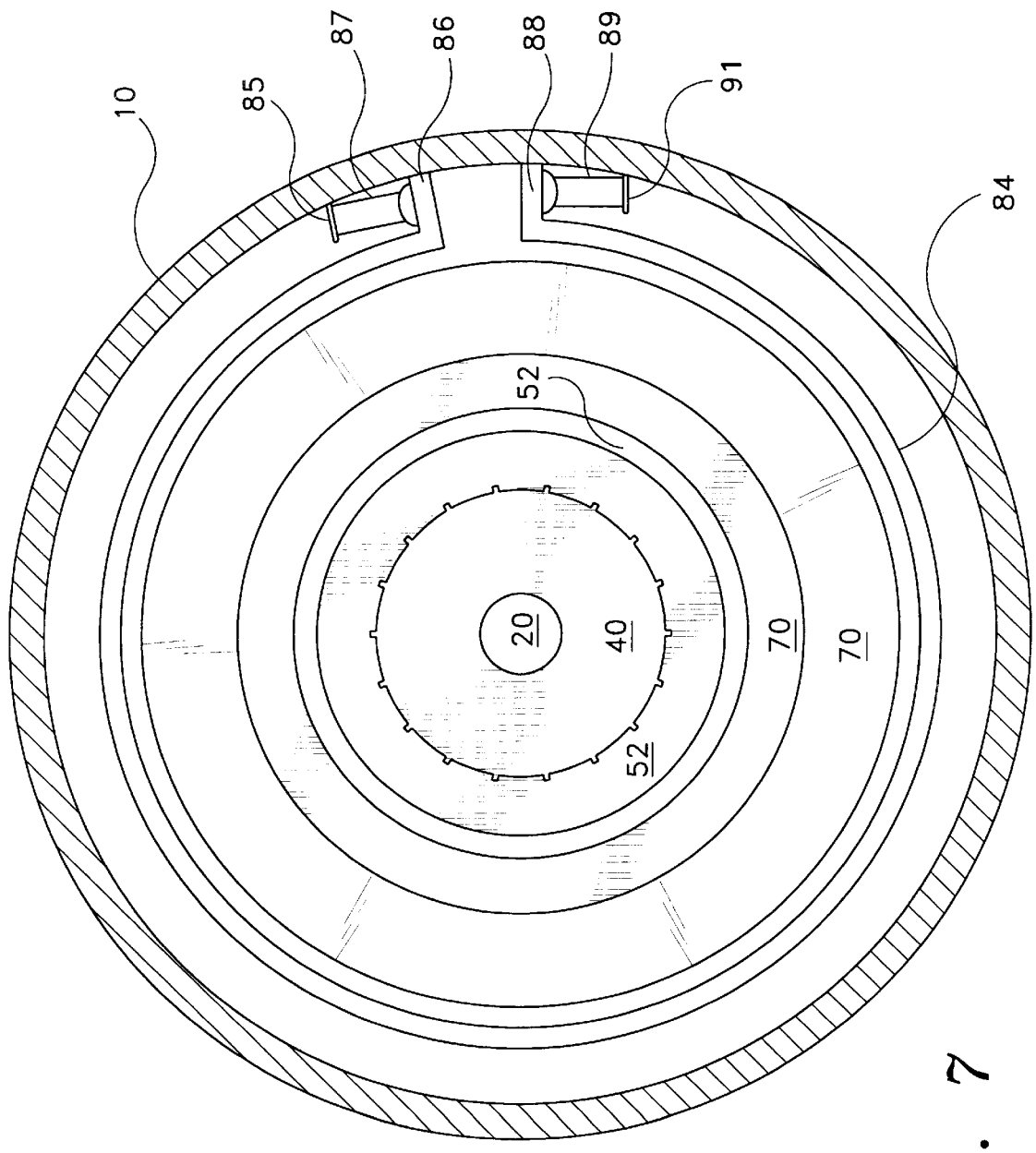
FIG. 7 is a cross-sectional view of the support housing of the first embodiment showing a suitable arrangement of actuating the brake band.

FIG. 7 shows a cross-sectional view of the support housing 10 of the first embodiment showing one arrangement of actuating the brake band 84. This arrangement uses a pair of hydraulic plungers, represented as 87 and 89, as are conventionally used in brakes of this type. The hydraulic plungers 87 and 89 are fixed at one end to the support housing 10 by braces 85 and 91, respectively, and connected at the other end to ends 86 and 88, respectively. When the hydraulic plungers are activated they force ends 86 and 88 towards each other, thereby forcing inner surface 90 of the brake band 84 to frictionally engage the planetary carrier 70. Alternative means of actuating the brake band 84 include using either a mechanical mechanism or a pneumatic mechanism in place of the hydraulic plungers to force ends 86 and 88 together. Also the second actuating mechanism, represented by 89, could be eliminated and end 88 could be fixed to the support housing 10 by brace 91.

The first embodiment of the hybrid transmission using the first clutching assembly as shown in FIGS. 1 and 4 further includes conical portion 76 of the planetary carrier 70, a synchronizing ring 60, a first hub 40, a first annular engagement ring 52 and a mechanism for sliding the first engagement ring, well known in the prior art and schematically represented by the assembly 200.

In the first embodiment of the present invention the planetary carrier 70 includes a conical portion 76. At the broad end of the conical portion 76 are teeth 80. Outer surface 78 of the conical portion 76 sits flush with the inner surface 68 of the synchronizing ring 60. Synchronizing ring 60 also has a conical shape and has teeth 66 at its broad end which match and sit adjacent to the teeth 80 on the conical portion 76 of the planetary carrier 70. Synchronizing ring 60 has a hole 62 which is freely rotatable about the input shaft 20. The outer surface 64 of the synchronizing ring 60 sits flush with the second inner surface 51 of the first hub 40.

The input shaft 20 of the hybrid transmission has a first hub meshing section 22 having external splines which engage the inner surface 42 of the first hub 40, thereby forcing the input shaft 20 and the first hub 40 to rotate at the same speed. The first inner surface 50 of the first hub 40 sits flush with the outer surface 78 of the conical portion 76 of the planetary carrier 70. The outer surface of the first hub 40 has teeth 44 which mesh with, and are slidably engaged to, the grooves 54 on the inner surface of the first annular engagement ring 52. Teeth 44 also match and sit adjacent to teeth 66 on the synchronizing ring 60. First engagement ring 52 is able to slide along its axis on the first hub 40. The outer surface of the first engagement ring 52 has an annular groove 58.

One additional feature that the first embodiment includes is that the outer surface of the first hub 40 has one or more bores in which a spring 46 and a ball bearing 48 sit. The ball bearing 48 protrudes from the first hub 40 and mates with indentations 56 on the inner surface of the first engagement ring 52. The spring-biased ball bearings 48 and indentations 56 tend to prevent the first hub 40 and the first engagement ring 52 from sliding relative to one another unless sufficient force is used to overcome this bond.

Finally, the first embodiment includes a schematically represented mechanism 200 for sliding the first engagement ring 52 in an axial direction by engaging the annular groove 58. The sliding mechanism can be either a lever or a hydraulic or pneumatic actuator which is well known in the prior art and attached to the support housing 10 and is capable of engaging the annular groove 58 on the first engagement ring 52. Any other conventional mechanism may also be used to slide the first engagement ring 52.

The sliding mechanism can be actuated while the input shaft 20 is rotating. The sliding mechanism forces the first engagement ring 52 and the first hub 40 (due to the spring biased ball bearings 48 and indentations 56) in an axial direction along input shaft 20 towards the planetary carrier 70. When the second inner surface 51 of the first hub 40 comes in contact with outer surface 64 of the synchronizing ring 60, the frictional forces between surfaces 51 and 64 will force the synchronizing ring 60 to increase its rotational speed until it is equal to the rotational speed of the first hub 40 and first engagement ring 52. The grooves 54 on the inner surface of the first engagement ring 52 will smoothly engage with teeth 66 on the synchronizing ring 60 when their speeds have equalized.

At the same time inner surface 68 of the synchronizing ring 60 and first inner surface 50 of the first hub will frictionally engage outer surface 78 of the planetary carrier 70 and thereby increase the rotational speed of the planetary carrier 70 until it is equal to the rotational speed of the synchronizing ring 60, the first hub 40 and the first engagement ring 52. The synchronizing ring 60 gives an intermediate semi-locked stage to prevent premature locking between the first engagement ring 52 and the planetary carrier 70. The grooves 54 on the inner surface of the first engagement ring 52 will smoothly engage with teeth 80 on the planetary carrier 70 when their speeds have equalized. The planetary carrier 70 will then rotate in the same direction and at the same speed as the input shaft 20, due to the resulting "caging" of the planetary gears 100 as will be described more fully below, until the first engagement ring 52 is slid back into the original position.

The first embodiment of the present invention has three operating conditions. The first condition is a neutral condition which gives zero output shaft revolutions for every input shaft revolution. The second condition is a forward condition which gives one output shaft revolution for every input shaft revolution. And the third condition is a reverse condition which gives a reversed and variable output shaft revolution for every input shaft revolution.

The first condition is achieved when the brake band 84 is not being actuated and when the first engagement ring 52 is in a neutral position on the first hub 40 such that the grooves 54 on the first engagement ring 52 are not engaged with either teeth 66 or teeth 80. In this position the input shaft 20 is rotating in a clockwise direction, for example, as is the first hub 40 and consequently the first engagement ring 52. The sun gear 92 is also rotating with the input shaft 20 in a clockwise direction. The sun gear 92 is forcing the planetary gears 100 to rotate on planetary gear pinions 98 in a counterclockwise direction and to "walk" around the input shaft 20 in a clockwise direction but at a slower speed than the input shaft 20. The planetary gear pinions 98 force the planetary carrier 70 to rotate in a clockwise direction but at a slower speed than the input shaft 20. The speed at which the planetary gears are "walking" around the input shaft is a function of the diameter of the sun gear 92 and the diameter of the planetary gears 100 and can be varied accordingly. The planetary gears 100 are merely "walking" around the inner surface of the ring gear 104 and therefore not forcing either the ring gear 104 or the output shaft 34 to rotate.

The second condition is achieved when the brake band 84 is not being actuated and when the first engagement ring 52 is in a forward position on the first hub 40 such that the grooves 54 on the first engagement ring 52 are engaged with both teeth 66 and teeth 80. In this position the input shaft 20 is rotating in a clockwise direction, for example, as is the first hub 40 and the first engagement ring 52 and consequently the planetary carrier 70. The sun gear 92 is also rotating with the input shaft 20 in a clockwise direction. Since the sun gear 92 is rotating at the same speed as the planetary carrier 70, the planetary gears are locked in a fixed rotational position on the planetary gear pinions 98. The planetary gears are said to be "caged." The planetary gears 100 are engaged to the grooves 110 on the inner surface of the ring gear 104 and therefore are forcing both the ring gear 104 and the output shaft 34 to rotate in a clockwise direction at the same speed as the input shaft.

The third condition is achieved when the brake band 84 is being actuated but the first engagement ring 52 is in a neutral position on the first hub 40 such that the grooves 54 on the first engagement ring 52 are not engaged with either teeth 66 or teeth 80. In this position the input shaft 20 is rotating in a clockwise direction, for example, as is the first hub 40 and consequently the first engagement ring 52. The sun gear 92 is also rotating with the input shaft 20 in a clockwise direction. The sun gear 92 is forcing the planetary gears 100 to rotate on planetary gear pinions 98 in a counterclockwise direction but, since the planetary carrier 70 is not free to rotate due to the frictional forces created by the actuated brake band 84, the planetary gears are not free to rotate around the input shaft 20. The planetary gears 100 force the inner surface of the ring gear 104 to rotate in a counter-clockwise direction which consequently forces the output shaft 34 to rotate in a counterclockwise direction at the same speed as the ring gear 104. The speed at which the ring gear rotates is a function of the diameter of the sun gear 92 and the diameter of the planetary gears 100 and can be varied accordingly.

The second embodiment of the hybrid transmission using the first clutching assembly as shown in FIGS. 2 and 5 further includes a cylindrical portion 74 on the planetary carrier 70 having a tapered end and teeth 77, teeth 109 on ring gear 104, an annular baulk ring 112, a second hub 120, a second annular engagement ring 132, and a mechanism 200 for sliding the second engagement ring.

In the second embodiment of the present invention the planetary carrier 70 includes a cylindrical portion 74 having teeth 77. One end of the cylindrical portion of the planetary carrier 70 has a tapered portion with a first surface 71 and a second surface 75 leading to edge 73. First surface 71 of the cylindrical portion 74 sits flush with the inner surface 114 of the baulk ring 112. Second surface 75 sits flush with the inner tapered surface 122 of the second hub 120. Baulk ring 112 also has a tapered surface 114 and has teeth 118 on its outer surface which match and sit adjacent to the teeth 77 on the cylindrical portion 74 of the planetary carrier 70. The baulk ring 112 is freely rotatable about the input shaft 20 and is held in position by the planetary carrier 70 and the second hub 120. The outer surface 116 of the baulk ring 112 sits flush with the inner tapered surface 122 of the second hub 120.

The outer surface of the ring gear 104 has teeth 109 which mesh with, and are slidably engaged to, grooves 126 on the inner surface of the second hub 120. In order to create teeth 109 with sufficient length and to give the teeth sufficient support, the base section of the ring gear 104 is enlarged compared to the first embodiment. The outer surface of the second hub 120 has teeth 124 which mesh with the grooves 134 on the inner surface of the second annular engagement ring 132. Teeth 124 also match and sit adjacent to teeth 118 on the baulk ring 112. Second engagement ring 132 is able to slide along its axis on the second hub 120. The outer surface of the second engagement ring 132 has an annular groove 138.

One additional feature that the second embodiment preferably includes is that the outer surface of the second hub 120 has one or more bores in which a spring 128 and a ball bearing 130 sit. The ball bearing 130 protrudes from the second hub 120 and mates with indentations 136 on the inner surface of the second engagement ring 132. The spring-biased ball bearings 130 and indentations 136 tend to prevent the second hub 120 and the second engagement ring 132 from sliding relative to one another unless sufficient force is used to overcome this bond.

Finally, the second embodiment includes the well known mechanism 200 for sliding the second engagement ring 132 in an axial direction by engaging the annular groove 138. The sliding mechanism for the second embodiment is identical to that used to slide the first engagement ring in the first embodiment.

The sliding mechanism 200 can be actuated while the input shaft 20 is rotating. The sliding mechanism forces the second engagement ring 132 and the second hub 120 (due to the spring biased ball bearings 130 and indentations 136) in an axial direction along output shaft 34 towards the planetary carrier 70. When inner surface 122 of the second hub 120 comes in contact with outer surface 116 of the baulk ring 112, the frictional forces between surfaces 122 and 116 will force the second hub 120 and the second engagement ring 132 to begin rotating and to increase their rotational speed until they are equal to the rotational speed of the baulk ring 112. The grooves 134 on the inner surface of the second engagement ring 132 will smoothly engage with teeth 118 on the baulk ring 112 when their speeds have equalized.

At the same time inner tapered surface 114 of the baulk ring 112 and inner surface 122 of the second hub 120 will frictionally engage surface 71 and surface 75 of the planetary carrier 70, respectively, and thereby increase the rotational speed of the baulk ring 112, the second hub 120, and the second engagement ring 132, until they are equal to the rotational speed of the planetary carrier 70. The baulk ring 112 gives an intermediate semi-locked stage to prevent premature locking of the second engagement ring 132 and the planetary carrier 70. The grooves 134 on the inner surface of the second engagement ring 132 will smoothly engage with teeth 77 on the planetary carrier 70 when their speeds have equalized. The planetary carrier 70 will then rotate in the same direction, due to the resulting "caging" of the planetary gears 110, and at the same speed as the input shaft 20 until the second engagement ring 132 is slid back into the original position.

The second embodiment of the present invention also has three operating conditions. The first condition is a neutral condition which gives zero output shaft revolutions for every input shaft revolution. The second condition is a forward condition which gives one output shaft revolution for every input shaft revolution. And the third condition is a reverse condition which gives a reversed and variable output shaft revolution for every input shaft revolution. The first and third conditions are essentially identical to those described for the first embodiment. The second condition is slightly different and therefore is described below.

The second condition is achieved when the brake band 84 is not being actuated and when the second engagement ring 132 is in a forward position on the second hub 120 such that the grooves 134 on the second engagement ring 132 are engaged with both teeth 118 and teeth 77. In this position the input shaft 20 is rotating in a clockwise direction, for example, as is the sun gear 92. Since the ring gear 104 is locked to the planetary carrier 70, the planetary gears 100 are locked in a fixed rotational position on the planetary gear pinions 98. The planetary gears are said to be "caged."

Therefore, as the sun gear 92 rotates with the input shaft 20 in a clockwise direction, the planetary carrier 70, the second hub 120, the engagement ring 132, the ring gear 104, and consequently the output shaft 34 are all rotated in a clockwise direction at the same speed as the input shaft.

The third embodiment of the hybrid transmission using the first clutching assembly as shown in FIGS. 3 and 6 includes all of the elements and limitations of the first and second embodiments. The third embodiment includes conical portion 76 of the planetary carrier 70, cylindrical portion 74 on the planetary carrier 70 having a tapered end and teeth 77, teeth 109 on ring gear 104, a synchronizing ring 60, an annular baulk ring 112, a first and a second hub, 40 and 120, a first and a second annular engagement ring, 52 and 132, and a mechanism 200 for sliding each of the first and the second engagement rings.

The third embodiment of the present invention has four operating conditions. The third embodiment has a neutral condition which gives zero output shaft revolutions for every input shaft revolution and is essentially identical to that described for the first and second embodiments. The third embodiment has two forward conditions which give one output shaft revolution for every input shaft revolution and are essentially identical to the second operating conditions for the first and the second embodiments. And finally, the third embodiment has a reverse condition which gives a reversed and variable output shaft revolution for every input shaft revolution and is essentially identical to that described for the first and the second embodiments. The increased number of operating conditions increases the number of potential applications for the third embodiment of the present invention.

FIG. 8 shows the preferred clutching assembly which can be used in both the first and the third embodiment in place of the first clutching assembly shown in FIGS. 1, 3, 4, and 6. The preferred clutching assembly includes first hub 40A, first engagement ring 52A, first synchronizing ring 60A, and planetary carrier 70A, in place of first hub 40, first annular engagement ring 52, first synchronizing ring 60, and planetary carrier 70.

The first embodiment of the present invention with the preferred clutching assembly includes planetary carrier 70A with a conical portion 76A. At the broad end of the conical portion 76A are teeth 80A. Outer surface 78A of the conical portion 76A sits flush with the inner surface 68A of the first synchronizing ring 60A. First synchronizing ring 60A also has a conical shape and has teeth 66A at its broad end which match and sit adjacent to the teeth 80A on the conical portion 76A of the planetary carrier 70A. First synchronizing ring 60A has a hole 62A and a first plurality of notches 63A, preferably three, each notch 63A having a surface 64A thereon.

The input shaft 20 of the hybrid transmission has a first hub meshing section 22 having external splines which engage the inner surface 42A of the first hub 40A, thereby forcing the input shaft 20 and the first hub 40A to rotate at the same speed. The first inner surface 50A of the first hub 40A sits approximately adjacent to the outer surface 78A of the conical portion 76A of the planetary carrier 70A. The outer surface of the first hub 40A has teeth 44A which mesh with, and are slidably engaged to, the grooves 54A on the inner surface of the first annular engagement ring 52A. Teeth 44A also match and sit adjacent to teeth 66A on the first synchronizing ring 60A. First engagement ring 52A is able to slide along its axis on the first hub 40A, which is in a fixed position on the input shaft 20. The outer surface of the first engagement ring 52A has an annular groove 58A.

The first hub 40A of the preferred clutching assembly also has an outer surface with a first plurality of slots 45A which correspond to the notches 63A on the first synchronizing ring 60A. Within the slots 45A snugly sit a first plurality of keys 48A which are engaged to notches 63A and thereby cause the first hub 40A and the first synchronizing ring 60A to rotate in unison with input shaft 20. The first hub 40A has a pair of annular lips 43A extending for its outer surface in opposing directions along the axis of the input shaft 20. A first pair of C-shaped springs 46A are compressed with the annular lips 43A so that when the keys 48A are sitting in the slots 45A the keys are forced in a radial direction outward away from the input shaft 20. The keys 48A have a lip 47A on either end which prevents the C-shaped springs 46A from sliding off of the keys 48A. The keys 48A have a ridge 49A in the center which extends in the opposite direction as the lips 47A and which mates with indentation 56A on the inner surface of the first engagement ring 52A. The spring biased keys 48A and indentation 56A tend to prevent the first hub 40A and the first engagement ring 52A from sliding relative to one another unless sufficient force is used to overcome this bond.

When the sliding mechanism is actuated it forces the first engagement ring 52A and the first synchronizing ring 60A (due to the spring biased keys 48A and indentation 56A) in an axial direction along the first hub 40A towards the planetary carrier 70A. Notice that the first hub 40A does not translate on the input shaft 20 which results in less wear between the first hub 40A and the input shaft 20. As the engagement ring 52A is forced towards the planetary carrier 70A, the keys 48A push against surface 64A and force the first synchronizing ring 60A into frictional engagement with the planetary carrier 70A. When the inner surface 68A of the first synchronizing ring 60A comes in contact with outer surface 78A of the planetary carrier 70A, the frictional forces between surfaces 68A and 78A will force the planetary carrier 70A to increase its rotational speed until it is equal to the rotational speed of the first hub 40A and first engagement ring 52A. The grooves 54A on the inner surface of the first engagement ring 52A will smoothly engage with teeth 66A on the first synchronizing ring 60A once their speeds have equalized.

If grooves 54A, which are now engaged with teeth 66A, are aligned with teeth 80A then the first engagement ring 52A can be forced into engagement with the planetary carrier 70A. In order to ensure engagement even when grooves 54A and teeth 80A are misaligned, the notches 63A should be larger than the keys 48A so as to allow the first synchronizing ring 60A to have some play in relation to the first hub 40A. This play allows the first hub 40A to rotate slightly in relation to the first synchronizing ring 60A and the planetary carrier 70A in order to correct any misalignment. Once fully engaged, the planetary carrier 70A will then rotate in the same direction and at the same speed as the input shaft 20, due to the resulting "caging" of the planetary gears 100, until the first engagement ring 52A is slid back into the original position.

FIG. 9 shows the preferred clutching assembly which can be used in both the second and the third embodiment in place of the first clutching assembly shown in FIGS. 2, 3, 5, and 6. The preferred clutching assembly includes second hub 120A, second engagement ring 132A, second synchronizing ring 112A, and planetary carrier 70A, in place of second hub 120, second annular engagement ring 132, second baulk ring 112, and planetary carrier 70.

In the second embodiment of the present invention the planetary carrier 70A includes a cylindrical portion 74A having teeth 77A. One end of the cylindrical portion of the planetary carrier 70A has a tapered portion with a first surface 71A and a second surface 75A leading to edge 73A. First surface 71A of the cylindrical portion 74A sits flush with the inner surface 114A of the second synchronizing ring 112A. Second surface 75A sits adjacent to the surface 122A of the second hub 120A. Second synchronizing ring 112A has a tapered surface 114A and has teeth 118A on its outer surface which match and sit adjacent to the teeth 77A on the cylindrical portion 74A of the planetary carrier 70A. The second synchronizing ring 112A is held in position by the planetary carrier 70A and the second hub 120A. Second synchronizing ring 112A has a second plurality of notches 115A, preferably three, each notch 115A having a surface 116A thereon.

The outer surface of the ring gear 104A has grooves 109A which mesh with, and are engaged to, teeth 126A on the inner surface of the second hub 120A. In order to create grooves 109A with sufficient length and to give the grooves sufficient support, the base section of the ring gear 104A is enlarged compared to the first embodiment. The outer surface of the second hub 120A has teeth 124A which mesh with the grooves 134A on the inner surface of the second annular engagement ring 132A. Teeth 124A also match and sit adjacent to teeth 118A on the second synchronizing ring 112A. Second engagement ring 132A is able to slide along its axis on the second hub 120A, which is in a fixed position on the ring gear 104A. The outer surface of the second engagement ring 132A has an annular groove 138A.

The second hub 120A of the preferred clutching assembly also has an outer surface with a second plurality of slots 127A which correspond to the notches 115A on the second synchronizing ring 112A. Within the slots 127A snugly sit a second plurality of keys 130A which are engaged to notches 115A and thereby cause the second hub 120A and the second synchronizing ring 112A to rotate in unison with ring gear 104A and output shaft 34. The second hub 120A has a pair of annular lips 125A extending for its outer surface in opposing directions along the axis of the output shaft 34. A second pair of C-shaped springs 128A are compressed with the annular lips 125A so that when the keys 130A are sitting in the slots 127A the keys are forced in a radial direction outward away from the output shaft 34. The keys 130A have a lip 129A on either end which prevents the C-shaped springs 128A from sliding off of the keys 130A. The keys 130A have a ridge 131A in the center which extends in the opposite direction as the lips 129A and which mates with indentation 136A on the inner surface of the second engagement ring 132A. The spring-biased keys 130A and indentation 136A tend to prevent the second hub 120A and the second engagement ring 132A from sliding relative to one another unless sufficient force is used to overcome this bond.

When sliding mechanism is actuated it forces the second engagement ring 132A and the second synchronizing ring 112A (due to the spring-biased keys 130A and indentation 136A) in an axial direction along the second hub 120A towards the planetary carrier 70A. Notice that the second hub 120A does not translate on the ring gear 104A or the output shaft 34 which results in less wear between the second hub 120A and the ring gear 104A. As the second engagement ring 132A is forced towards the planetary carrier 70A, the keys 130A push against surface 116A and force the second synchronizing ring 112A into frictional engagement with the planetary carrier 70A. When the inner surface 114A of the second synchronizing ring 112A comes in contact with outer surface 71A of the planetary carrier 70A, the frictional forces between surfaces 71A and 114A will increase the rotational speed of the synchronizing ring 112A, the second hub 120A, and the second engagement ring 132A, until they are equal to the rotational speed of the planetary carrier 70A. The grooves 134A on the inner surface of the second engagement ring 132A will smoothly engage with teeth 118A on the second synchronizing ring 112A once their speeds have equalized.

If grooves 134A, which are now engaged with teeth 118A, are aligned with teeth 77A then the second engagement ring 132A can be forced into engagement with the planetary carrier 70A. In order to ensure engagement even when grooves 134A and teeth 77A are misaligned, the notches 115A should be larger than the keys 130A so as to allow the second synchronizing ring 112A to have some play in relation to the second hub 120A. This play allows the second hub 120A to rotate slightly in relation to the second synchronizing ring 112A and the planetary carrier 70A in order to correct any misalignment. Once fully engaged, the planetary carrier 70A will then rotate in the same direction and at the same speed as the input shaft 20, due to the resulting "caging" of the planetary gears 100, until the second engagement ring 132A is slid back into the original position.

The preferred clutching assembly may also be used in the third embodiment by combining the first and second embodiments as was done for the first clutching assembly. Each of the embodiments of the present invention using the preferred clutching assembly still retain the same operating conditions as described for the first clutching assembly.

One feature that is depicted in FIGS. 8 and 9, but is omitted from FIGS. 1 through 6 for simplicity's sake, is the use of pointed teeth on the planetary carrier, synchronizing ring, and engagement ring. Teeth 66A, 80A, 77A, and 118A, and grooves 54A and 134A are angled in the conventionally known manner in order to increase the chances of a smooth meshing of the teeth and grooves. It is contemplated that teeth 66, 80, 77, and 118, and grooves 54 and 134 can be angled in this manner to increase the chances of a smooth meshing of the teeth and grooves.

All of the elements of the three embodiments are made of materials conventionally used for these parts. The input shaft 20, output shaft 34, brake band actuators, and engagement ring sliding mechanisms can be designed to make the present invention a direct replacement for other types of transmissions. The brake band actuators and the engagement ring sliding mechanisms can be controlled via one, all, or any combination of mechanical, electrical, hydraulic, and pneumatic means.

As an alternative to the conventionally known synchromesh devices described above for releasably coupling the planetary carrier 70 to the ring gear 104, a conventional single or multiple disc type braking device may also be used. However, the synchro-mesh designs described above are preferred because they create a solid coupling that allows the entire internal assembly to rotate as one solid piece and therefore results in low parasitic drag. Any other conventional clutching assembly used in manual transmissions can be used in the present invention in order to achieve comparable results. The present invention is not limited to using the two clutching assemblies described above.

Although the present invention is designed to be used without a clutch mechanism on either the input 20 or the output 34 shafts, a clutch mechanism may be used with the hybrid transmission if desired or as the application requires. The present invention can operate at moderate shaft R.P.M. without the aid of a clutch.

It should be noted that while the term input shaft is used for shaft 20 and the term output shaft is used for shaft 34 for simplicity in the above description, the power input to the hybrid transmission of the present invention can be through shaft 34 and the power output from the transmission can be through shaft 20. It should also be noted that power input to the transmission, whether through shaft 20 or shaft 34, can be in either a clockwise or a counterclockwise direction.

It is to be understood that the present invention is not limited to the embodiments described above, but encompasses any and all embodiments within the scope of the following claims.

I claim:

1. A hybrid transmission comprising:

a support housing;

a first shaft rotatably mounted on said housing;

a second shaft axially aligned to said first shaft and rotatably mounted on said housing, said second shaft being independently rotatable from said first shaft;

a sun gear engaged to said first shaft;

a ring gear engaged to said second shaft, said ring gear extending toward and encircling said sun gear, said ring gear having an inner surface with grooves thereon located opposite said sun gear;

a planetary carrier freely rotatable about said first shaft;

a planetary gear rotatably supported by said planetary carrier and meshing with said sun gear and said grooves of said inner surface of said ring gear;

a brake band substantially encircling said planetary carrier, said brake band having a first end and a second end, said brake band being coupled to said support housing, said brake band having means attached thereto for actuating said brake band such that said brake band frictionally engages said planetary carrier and thereby prevents its rotation; and means for engaging said planetary carrier to said first shaft wherein said first shaft and said planetary carrier are forced to have substantially synchronized speeds of rotation prior to engagement, wherein said means for engaging said planetary carrier to said first shaft comprise:

said planetary carrier having a conical portion thereon, said conical portion having a narrow end and a broad end, said broad end of said conical portion having teeth thereon;

a first synchronizing ring sitting flush with said conical portion of said planetary carrier, said first synchronizing ring having a narrow end and a broad end, said narrow end having a plurality of notches, said broad end having teeth, said teeth matching and sitting adjacent to said teeth on said conical portion of said planetary carrier;

a first hub sitting adjacent said planetary carrier, said first hub being engaged to said first shaft, said first hub having an outer surface with teeth thereon, said outer surface having a plurality of slots, said slots corresponding to said notches, said first hub having a pair of annular lips extending from said outer surface in opposing directions along the axis of said first shaft;

a first pair of C-shaped springs, said springs being in compression within said annular lips;

a first plurality of keys each having a first end, a middle portion and a second end, said first plurality of keys fitting within said plurality of slots on said first hub, said keys being forced in a radial direction outward from said first shaft by said springs, said first and said second ends each having a lip thereon, said middle portion having a ridge thereon extending in the opposite direction of said lips, said first end loosely fitting within said notches on said first synchronizing ring;

a first annular engagement ring having an inner surface with grooves thereon, said grooves being slidably engaged to said teeth of said first hub, said first annular engagement ring having an outer surface with an annular groove thereon, said inner surface having an annular indentation therearound, said indentation mating with said ridge on said first plurality of keys; and means for sliding said first engagement ring using said annular groove such that said first engagement ring engages said teeth on said first synchronizing ring and said teeth on said conical portion of said planetary carrier thereby securing said planetary carrier to said first shaft and producing rotation of said first shaft and said second shaft in unison.

2. The hybrid transmission as defined in claim 1 wherein said means for actuating said brake band comprise a hydraulic plunger.

3. The hybrid transmission as defined in claim 1 further comprising means for engaging said planetary carrier to said second shaft wherein said second shaft and said planetary carrier are forced to have substantially synchronized speeds of rotation prior to engagement.

4. The hybrid transmission as defined in claim 3 wherein said means for engaging said planetary carrier to said second shaft comprise:

said ring gear having an outer surface with grooves thereon;

said planetary carrier having a cylindrical portion with a first and a second end, said first end being attached to said conical portion, said second end having an outer surface with teeth thereon, said second end being tapered;

a second synchronizing ring sitting flush with said tapered portion of said planetary carrier, said second synchronizing ring having a narrow end and a broad end, said narrow end having a plurality of notches, said broad end having teeth, said teeth matching and sitting adjacent to said teeth on said tapered portion of said planetary carrier;

a second hub sitting adjacent said tapered portion of said planetary carrier, said second hub having an inner surface with teeth thereon, said teeth of said second hub being engaged to said grooves of said outer surface of said ring gear, said second hub having an outer surface with teeth thereon, said outer surface having a plurality of slots, said slots corresponding to said notches, said second hub having a pair of annular lips extending from said outer surface in opposing directions along the axis of said second shaft;

a second pair of C-shaped springs, said springs being in compression within said annular lips;

a second plurality of keys each having a first end, a middle portion and a second end, said second plurality of keys fitting within said plurality of slots on said second hub, said keys being forced in a radial direction outward from said second shaft by said springs, said first and said second ends each having a lip thereon, said middle portion having a ridge thereon extending in the opposite direction of said lips, said first end loosely fitting within said notches on said second synchronizing ring;

a second annular engagement ring having an inner surface with grooves thereon, said grooves being slidably engaged to said teeth of said second hub, said second annular engagement ring having an outer surface with an annular groove thereon, said inner surface having an annular indentation therearound, said indentation mating with said ridge on said second plurality of keys; and means for sliding said second engagement ring using said annular groove such that said second engagement ring engages said teeth on said second synchronizing ring and said teeth on said tapered portion of said planetary carrier thereby securing said planetary carrier to said second shaft and producing rotation of said first shaft and said second shaft in unison.

5. The hybrid transmission as defined in claim 4 wherein:

said means for sliding said first engagement ring comprise a first lever engaged to said annular groove thereon; and said means for sliding said second engagement ring comprise a second lever engaged to said annular groove thereon.

6. The hybrid transmission as defined in claim 4 wherein:

said means for sliding said first engagement ring comprise a first hydraulic actuator engaged to said annular groove thereon; and said means for sliding said second engagement ring comprise a second hydraulic actuator engaged to said annular groove thereon.

7. A hybrid transmission comprising:

a support housing;

a first shaft rotatably mounted on said housing;

a second shaft axially aligned to said first shaft and rotatably mounted on said housing, said second shaft being independently rotatable from said first shaft;

a sun gear engaged to said first shaft;

a ring gear engaged to said second shaft, said ring gear extending toward and encircling said sun gear, said ring gear having an inner surface with grooves thereon located opposite said sun gear;

a planetary carrier freely rotatable about said first shaft;

a planetary gear rotatably supported by said planetary carrier and meshing with said sun gear and said grooves of said inner surface of said ring gear;

a brake band substantially encircling said planetary carrier, said brake band having a first end and a second end, said brake band being coupled to said support housing, said brake band having means attached thereto for actuating said brake band such that said brake band frictionally engages said planetary carrier and thereby prevents its rotation; and means for engaging said planetary carrier to said first shaft wherein said first shaft and said planetary carrier are forced to have substantially synchronized speeds of rotation prior to engagement, wherein said means for engaging said planetary carrier to said first shaft comprise:

said planetary carrier having a conical portion thereon, said conical portion having a narrow end and a broad end, said broad end of said conical portion having teeth thereon;

a synchronizing ring sitting flush with said conical portion of said planetary carrier, said synchronizing ring being freely rotatable about said first shaft, said synchronizing ring having a narrow end and a broad end, said broad end of said synchronizing ring having teeth, said teeth matching and sitting adjacent to said teeth on said conical portion of said planetary carrier;

a first hub sitting flush with said conical portion of said planetary carrier, said first hub being engaged to said first shaft, said first hub having an outer surface with teeth thereon, said outer surface having a spring biased ball bearing protruding therefrom;

a first annular engagement ring having an inner surface with grooves thereon, said grooves being slidably engaged to said teeth of said first hub, said first annular engagement ring having an outer surface with an annular groove thereon, said inner surface of said first engagement ring having an indentation thereon, said indentation mating with said ball bearing; and means for sliding said first engagement ring using said annular groove such that said first engagement ring engages said teeth on said synchronizing ring and said teeth on said conical portion of said planetary carrier thereby securing said planetary carrier to said first shaft and producing rotation of said first shaft and said second shaft in unison.

8. The hybrid transmission as defined in claim 7 further comprising means for engaging said planetary carrier to said second shaft wherein said second shaft and said planetary carrier are forced to have substantially synchronized speeds of rotation prior to engagement.

9. The hybrid transmission as defined in claim 8 wherein said means for engaging said planetary carrier to said second shaft comprise:

said ring gear having an outer surface with teeth thereon;

said planetary carrier having a cylindrical portion with a first and a second end, said first end being attached to said conical portion, said second end having an outer surface with teeth thereon, said second end being tapered;

an annular baulk ring having an outer surface with teeth thereon, said baulk ring sitting flush with said tapered second end of said planetary carrier, said baulk ring being freely rotatable, said teeth matching and sitt.ing adjacent to said teeth on said tapered second end of said planetary carrier;

a second hub sitting flush with said tapered second end of said planetary carrier, said second hub having an inner surface with grooves thereon, said grooves of said second hub being engaged to said teeth of said outer surface of said ring gear, said second hub having an outer surface with teeth thereon, said outer surfaces of said second hub each have a spring biased ball bearing protruding therefrom;

a second annular engagement ring having an inner surface with grooves thereon, said grooves being slidably engaged to said teeth of said second hub, said second engagement ring having an outer surface with an annular groove thereon, said inner surfaces of said second engagement ring having an indentation thereon, each said indentation mating with said ball bearing; and means for sliding said second engagement ring using said annular groove such that said second engagement ring engages said teeth on said baulk ring and said teeth on said second end of said planetary carrier thereby securing said planetary carrier to said first shaft and producing rotation of said first shaft and said second shaft in unison.

10. The hybrid transmission as defined in claim 9 wherein:

said means for sliding said first engagement ring comprise a first lever engaged to said annular groove thereon; and said means for sliding said second engagement ring comprise a second lever engaged to said annular groove thereon.

11. The hybrid transmission as defined in claim 9 wherein:

said means for sliding said first engagement ring comprise a first hydraulic actuator engaged to said annular groove thereon; and said means for sliding said second engagement ring comprise a second hydraulic actuator engaged to said annular groove thereon.

12. A hybrid transmission comprising:

a support housing;

a first shaft rotatably mounted on said housing;

a second shaft axially aligned to said first shaft and rotatably mounted on said housing, said second shaft being independently rotatable from said first shaft;

a sun gear engaged to said first shaft;

a ring gear engaged to said second shaft, said ring gear extending toward and encircling said sun gear, said ring gear having an inner surface with grooves thereon located opposite said sun gear;

a planetary carrier freely rotatable about said first shaft, said planetary carrier having a conical portion thereon, said conical portion having a narrow end and a broad end, said broad end of said conical portion having teeth thereon;

a planetary gear rotatably supported by said planetary carrier and meshing with said sun gear and said grooves of said inner surface of said ring gear;

a brake band substantially encircling said planetary carrier, said brake band having a first end and a second end, said brake band being coupled to said support housing, said brake band having means attached thereto for actuating said brake band such that said brake band frictionally engages said planetary carrier and thereby prevents its rotation; and means for engaging said planetary carrier to said second shaft wherein said second shaft and said planetary carrier are forced to have substantially synchronized speeds of rotation prior to engagement.

13. The hybrid transmission as defined in claim 12 wherein said means for actuating said brake band comprise a hydraulic plunger.

14. The hybrid transmission as defined in claim 12 wherein said means for engaging said planetary carrier to said second shaft comprise:

said ring gear having an outer surface with grooves thereon;

said planetary carrier having a cylindrical portion with a first and a second end, said first end being attached to said conical portion, said second end having an outer surface with teeth thereon, said second end being tapered;

a synchronizing ring sitting flush with said tapered portion of said planetary carrier, said synchronizing ring having a narrow end and a broad end, said narrow end having a plurality of notches, said broad end having teeth, said teeth matching and sitting adjacent to said teeth on said tapered portion of said planetary carrier;

a hub sitting adjacent said tapered portion of said planetary carrier, said hub having an inner surface with teeth thereon, said teeth of said hub being engaged to said grooves of said outer surface of said ring gear, said hub having an outer surface with teeth thereon, said outer surface having a plurality of slots, said slots corresponding to said notches, said hub having a pair of annular lips extending from said outer surface in opposing directions along the axis of said second shaft;

a pair of C-shaped springs, said springs being in compression within said annular lips;

a plurality of keys each having a first end, a middle portion and a second end, said plurality of keys fitting within said plurality of slots on said hub, said keys being forced in a radial direction outward from said second shaft by said springs, said first and said second ends each having a lip thereon, said middle portion having a ridge thereon extending in the opposite direction of said lips, said first end loosely fitting within said notches on said synchronizing ring;

an annular engagement ring having an inner surface with grooves thereon, said grooves being slidably engaged to said teeth of said hub, said engagement ring having an outer surface with an annular groove thereon, said inner surface having an annular indentation therearound, said indentation mating with said ridge on said plurality of keys; and means for sliding said engagement ring using said annular groove such that said engagement ring engages said teeth on said synchronizing ring and said teeth on said tapered portion of said planetary carrier thereby securing said planetary carrier to said second shaft and producing rotation of said first shaft and said second shaft in unison.

15. The hybrid transmission as defined in claim 14 wherein said means for sliding said engagement ring comprise a lever engaged to said annular groove.

16. The hybrid transmission as defined in claim 14 wherein said means for sliding said engagement ring comprise a hydraulic actuator engaged to said annular groove.

17. The hybrid transmission as defined in claim 12 wherein said means for engaging said planetary carrier to said second shaft comprise:

said ring gear having an outer surface with teeth thereon;

said planetary carrier having a cylindrical portion with a first and a second end, said first end being attached to said conical portion, said second end having an outer surface with teeth thereon, said second end being tapered;

an annular baulk ring having an outer surface with teeth thereon, said baulk ring sitting flush with said tapered second end of said planetary carrier, said baulk ring being freely rotatable, said teeth matching and sitting adjacent to said teeth on said tapered second end of said planetary carrier;

a hub sitting flush with said tapered second end of said planetary carrier, said hub having an inner surface with grooves thereon, said grooves of said hub being engaged to said teeth of said outer surface of said ring gear, said hub having an outer surface with teeth thereon, said outer surfaces of said hub each have a spring biased ball bearing protruding therefrom;

an annular engagement ring having an inner surface with grooves thereon, said grooves being slidably engaged to said teeth of said hub, said engagement ring having an outer surface with an annular groove thereon, said inner surfaces of said engagement ring having an indentation thereon, each said indentation mating with said ball bearing; and means for sliding said engagement ring using said annular groove such that said engagement ring engages said teeth on said baulk ring and said teeth on said second end of said planetary carrier thereby securing said planetary carrier to said first shaft and producing rotation of said first shaft and said second shaft in unison.

18. The hybrid transmission as defined in claim 17 wherein said means for sliding said engagement ring comprise a lever engaged to said annular groove.

19. The hybrid transmission as defined in claim 17 wherein said means for sliding said engagement ring comprise a hydraulic actuator engaged to said annular groove.

* * * * *